United States Patent
Wshah et al.

(10) Patent No.: US 10,068,171 B2
(45) Date of Patent: Sep. 4, 2018

(54) MULTI-LAYER FUSION IN A CONVOLUTIONAL NEURAL NETWORK FOR IMAGE CLASSIFICATION

(71) Applicant: Conduent Business Services, LLC, Dallas, TX (US)

(72) Inventors: Safwan Wshah, Webster, NY (US); Beilei Xu, Penfield, NY (US); Orhan Bulan, Henrietta, NY (US); Jayant Kumar, San Jose, CA (US); Peter Paul, Penfield, NY (US)

(73) Assignee: Conduent Business Services, LLC, Dallas, TX (US)

(*) Notice: Subject to any disclaimer, the term of this patent is extended or adjusted under 35 U.S.C. 154(b) by 32 days.

(21) Appl. No.: 15/179,403

(22) Filed: Jun. 10, 2016

(65) Prior Publication Data
US 2017/0140253 A1    May 18, 2017

Related U.S. Application Data
(60) Provisional application No. 62/254,349, filed on Nov. 12, 2015.

(51) Int. Cl.
| | |
|---|---|
| G06K 9/62 | (2006.01) |
| G06N 3/08 | (2006.01) |
| G06K 9/00 | (2006.01) |
| G06K 9/46 | (2006.01) |

(52) U.S. Cl.
CPC ........... G06N 3/08 (2013.01); G06K 9/00785 (2013.01); G06K 9/00771 (2013.01); G06K 9/4628 (2013.01); G06K 2209/23 (2013.01)

(58) Field of Classification Search
None
See application file for complete search history.

(56) References Cited

U.S. PATENT DOCUMENTS
| | | | | |
|---|---|---|---|---|
| 7,472,007 B2* | 12/2008 | Kong | ................. | G06K 9/00369 |
| | | | | 280/734 |
| 7,676,441 B2* | 3/2010 | Matsugu | ............ | G06K 9/00604 |
| | | | | 382/155 |

(Continued)

OTHER PUBLICATIONS
Spatial Pyramid pooling—Recognition, Kaiming He et al., arXiv:1406.4729v3, Jan. 6, 2015, pp. 1-14.*

(Continued)

*Primary Examiner* — Jayesh A Patel
(74) *Attorney, Agent, or Firm* — Fay Sharpe LLP

(57) ABSTRACT

A method and system for domain adaptation based on multi-layer fusion in a convolutional neural network architecture for feature extraction and a two-step training and fine-tuning scheme. The architecture concatenates features extracted at different depths of the network to form a fully connected layer before the classification step. First, the network is trained with a large set of images from a source domain as a feature extractor. Second, for each new domain (including the source domain), the classification step is fine-tuned with images collected from the corresponding site. The features from different depths are concatenated with and fine-tuned with weights adjusted for a specific task. The architecture is used for classifying high occupancy vehicle images.

16 Claims, 3 Drawing Sheets

(56) References Cited

U.S. PATENT DOCUMENTS

| | | | | |
|---|---|---|---|---|
| 8,560,179 | B2* | 10/2013 | Basir | B60N 2/002 382/181 |
| 9,015,093 | B1* | 4/2015 | Commons | G01C 21/3602 701/23 |
| 2007/0172113 | A1* | 7/2007 | Sai | G01J 3/46 382/159 |
| 2013/0336538 | A1* | 12/2013 | Skaff | G06K 9/00785 382/104 |
| 2015/0134583 | A1* | 5/2015 | Tamatsu | G06N 3/08 706/25 |
| 2015/0170021 | A1* | 6/2015 | Lupon | G06N 3/063 706/15 |

OTHER PUBLICATIONS

Szegedy, C., et al., "Going Deeper with Convolutions," CVPR 2015.
Chopra, S., et al., DLID: Deep learning for domain adaptation by interpolating between domains; ICML workshop on challenges in representation learning; vol. 2; pp. 5; 2013.
Donahue, J., et al., Decaf: A deep convolutional activation feature for generic visual recognition; arXiv preprint; arXiv:1310.1531; 2013.
Ganin, Y., et al., V., Unsupervised domain adaptation by backpropagation; arXiv preprint; arXiv:1409.7495; 2014.
Arlan, Y., et al., Passenger compartment violation detection in HOV/HOT lanes; Intelligent Transportation Systems; IEEE Transactions; 2015.
Soldevila; pending U.S. Appl. No. 14/793,374, filed Jul. 7, 2015.
Rodriguez-Serrano; pending U.S. Appl. No. 14/861,386, filed Sep. 22, 2015.
Perronnin et al.; pending U.S. Appl. No. 14/691,021, filed Apr. 20, 2015.
Soldevila; pending U.S. Appl. No. 14/793,434, filed Jul. 7, 2015.
Babenko, et al., "Neural codes for image retrieval," ECCV, 2014.
Bergamo, et al., "PiCoDeS: Learning a compact code for novel-category recognition," NIPS, pp. 2088-2096, 2011.
Bottou, "Online algorithms and stochastic approximations," in Online Learning and Neural Networks, D. Saad, editor, pp. 9-42, Cambridge University Press, Cambridge, UK, 1998.
Chatfield, et al., "The devil is in the details: an evaluation of recent feature encoding methods," BMVC, pp. 1-12, 2011.
Chatfield et al., "Return of the devil in the details: delving deep into convolutional nets," BMVC, 2014.
Csurka, et al., "Visual categorization with bags of keypoints," ECCV SLCV workshop, pp. 1-22, 2004.
Deng, et al., "ImageNet: A large-scale hierarchical image database," CVPR, 2009.
Douze, et al., "Combining attributes and fisher vectors for efficient image retrieval," CVPR, pp. 745-752, 2011.
Fine, et al., "A hybrid GMM/SVM approach to speaker identification," IEEE ICASSP, (1), 417-420, 2001.
Girshick, et al., "Rich feature hierarchies for accurate object detection and semantic segmentation," CVPR, pp. 580-587, 2014.
Gong, et al., "Multi-scale orderless pooling of deep convolutional activation features," ECCV, pp. 392-407, 2014.
Gordo, et al., "Leveraging category-level labels for instance-level image retrieval," CVPR, pp. 3045-3052, 2012.
He, et al. "Spatial pyramid pooling in deep convolutional networks for visual recognition," ECCV, Lecture Notes in computer Science, vol. 8961, pp. 346-361, 2014.
Jaakkola, et al., "Exploiting generative models in discriminative classifiers," NIPS, pp. 487-493, 1998.
Jégou, et al., "Aggregating local descriptors into a compact image representation," CVPR, pp. 3304-3311, 2010.
Krizhevsky, et al., "ImageNet classification with deep convolutional neural networks," NIPS, pp. 1106-1114, 2012.
LeCun, et al., "Handwritten digit recognition with a backpropagation network," NIPS, pp. 396-404, 1989.
Oquab, et al., "Learning and transferring mid-level image representations using convolutional neural networks," CVPR, pp. 1717-1724, 2014
Peng, et al., Boosting VLAD with supervised dictionary learning and high-order statistics, ECCV, pp. 660-674, 2014.
Peng, et al., "Action recognition with stacked Fisher vectors," ECCV, pp. 581-595, 2014.
Perronnin, et al., "Fisher kernels on visual vocabularies for image categorization," CVPR, pp. 1-8, 2007.
Perronnin, et al., "Improving the fisher kernel for large-scale image classification," ECCV, pp. 143-156, 2010.
Razavian, et al., "CNN features off-the-shelf: An astounding baseline for recognition," CVPR Deep Vision Workshop, pp. 512-519, 2014.
Russakovsky, et al., "Imagenet large scale visual recognition challenge," arXiv, 1409.0575, 2014.
Sánchez, et al., "Image classification with the fisher vector: Theory and practice," IJCV, 2013.
Sermanet, et al., "OverFeat: Integrated recognition, localization and detection using convolutional networks," ICLR, 2014.
Simonyan, et al., "Deep Fisher Networks for Large-scale Image Classification," NIPS, 2013.
Simonyan, et al., "Very Deep Convolutional Networks for Large-Scale Image Recognition," arxiv 1409.1556, 2014.
Sivic, at al., "Video Google: A text retrieval approach to object matching in videos," ICCV, vol. 2, pp. 1470-1477, 2003.
Smith, et al., "Speech recognition using SVMs," NIPS, 1197-1204, 2001.
N. Smith and M. Gales. Using SVMs to classify variable length speech patterns. Technical report, Cambridge University, 2002.
Sydorov, et al., "Deep Fisher kernels—End to end learning of the Fisher kernel GMM parameters," CVPR, pp. 1402-1409, 2014.
Torresani, et al.,"Efficient object category recognition using classemes," ECCV, pp. 776-789, 2010.
Wang, et al., "Learning image similarity from Flickr groups using stochastic intersection kernel machines," ICCV, 2009.
Wei, et al., "CNN: single-label to multi-label," arXiv, 1406.5726, 2014.
Weston, et al., "Large scale image annotation: Learning to rank with joint word-image embeddings," ECML, 2010.
Yosinski, et al., "How transferable are features in deep neural networks ?" NIPS, pp. 3320-3328, 2014.
Zeiler, et al., "Visualizing and understanding convolutional networks," ECCV, pp. 818-833, 2014.
Zhou, et al., "Image classification using super-vector coding of local image descriptors," ECCV, pp. 141-154, 2010.

* cited by examiner

MULTI-LAYER FUSION IN A CONVOLUTIONAL NEURAL NETWORK FOR IMAGE CLASSIFICATION

TECHNICAL FIELD

The presently disclosed embodiments are directed to convolutional neural networks, more particularly to convolutional neural networks as applied to image classification, and still more particularly to a multi-layer fusion in a convolutional neural network for enhanced image classification across multiple domains.

BACKGROUND

As the number of vehicles on roadways increases each year, transportation agencies are looking for new ways to promote car-pooling, reduce traffic congestion and air pollution through lane management. High Occupancy Vehicle (HOV) lanes are standard car-pool lanes where typically either two or more vehicle occupants are required in order to use the lanes. Similarly, High Occupancy Tolling (HOT) lanes are used where single-occupant vehicles are allowed to use the HOV lane upon payment of a toll to utilize the full capacity of the HOV lanes. If the regulations are strictly enforced, HOV/HOT lanes are typically less congested due to the constraints on the number of vehicle occupants. However, enforcement of the rules of these lanes is currently performed by roadside enforcement officers using visual observation, which is known to be inefficient, costly, and potentially dangerous.

HOV and HOT lanes have been commonly practiced to both reduce traffic congestion and to promote car-pooling. Camera-based methods have been recently proposed for a cost-efficient, safe, and effective HOV/HOT lane enforcement strategy with the prevalence of video cameras in transportation imaging applications. An important step in automated lane enforcement systems is classification of localized window/windshield images to distinguish passenger from no-passenger vehicles to identify violators.

While existing imaging application techniques focus on the vehicle occupancy detection using various face, empty seat, or skin detection, recent techniques use image classification approaches to account for occlusion, typically for the images captures from side-view.

Following the localization of windshields/side-windows in captured images, these methods perform classification of the localized regions using local aggregation-based image features (e.g., fisher vectors) to distinguish passenger from no-passenger vehicles to identify violators. While the fisher vector-based classification accuracy is generally greater than about 95% for front view images, it significantly decreases for the side-view images to about 90% due to the increased within-class variation associated with the side-view images when compared to front-view images.

The use of deep convolutional neural networks (CNNs) has been shown to significantly outperform hand-crafted features in several classification tasks. However, training and/or fine-tuning such CNNs require a set of passenger/no-passenger images manually labeled by an operator, which requires substantial time and effort that can result in excessive operational cost and overhead.

It is well known that the first one or more layers of many deep CNNs learn features similar to Gabor filters and color blobs that appear not to be specific to a particular dataset or task, but in general they are applicable to many datasets and tasks. Features eventually transition from general to specific (i.e., task or domain specific) as the layers get deeper into the network. As such, transferability of a network to a new domain is negatively affected by the specificity of higher layer neurons to their original task at the expense of performance on the target task.

The GoogLeNet proposed by [1] achieved the best results for classification and detection in the ImageNet Large-Scale Visual Recognition Challenge 2014 (ILSVRC14). In comparison to other convolutional neural network architectures (e.g., AlexNet, VGG-M, VGG-D, VGG-F, etc.), GoogLeNet utilizes a deep architecture, wherein the work "deep" is defined by both the level of organization as well as in the more direct sense of increased network depth. However, one disadvantage of using a GoogLeNet system is that features from the network are extracted at only deep layers, thereby providing only high-level features.

Most image classification methods require large collections of manually annotated training examples to learn accurate object classification models. The time-consuming human labeling effort effectively limits these types of approaches in many real-world applications, which require the classification models developed in one situation to be quickly deployed to new environments. For example, for vehicle occupancy detection, a classifier (e.g., a support vector machine, a convolutional neural network (CNN), etc.) often must be retrained with images collected from each site to achieve the desired and consistent performance across different sites. However, such systems typically require thousands of images for the training process. The novel deep CNN fusion architecture of the present embodiments is designed to overcome this and other shortcomings, as well as to provide techniques for domain adaptation.

Domain adaptation of statistical classifiers, however, is the problem that arises when the data distribution in the test domain is different from the data distribution in the training domain.

There is a need for enhanced CNN image classification systems that enjoy expedited training and tuning across a plurality of distinct domains and environments.

There is a need for a deep CNN fusion architecture that can be used for domain adaptation when a small set of labeled data is available in the target domain.

INCORPORATION BY REFERENCE

The following references, the disclosures of which are incorporated herein by reference in their entireties, are mentioned:

[1] Szegedy, C., et al., "Going Deeper with Convolutions," CVPR 2015.
[2] Chopra, S., et al., DLID: Deep learning for domain adaptation by interpolating between domains; ICML workshop on challenges in representation learning; Vol. 2; pp. 5; 2013.
[3] Donahue, J., et al., Decaf: A deep convolutional activation feature for generic visual recognition; arXiv preprint; arXiv:1310.1531; 2013.
[4] Ganin, Y., et al., Unsupervised domain adaptation by backpropagation; arXiv preprint; arXiv:1409.7495; 2014.
[5] Artan, Y., et al., Passenger compartment violation detection in HOV/HOT lanes; Intelligent Transportation Systems; IEEE Transactions; 2015.

BRIEF DESCRIPTION

The need for domain adaptation is prevalent in many real-world classification problems. For example, binary classifiers for vehicle occupancy detection need to have consistent performance across multiple sites (e.g., Denver, San Diego, Rochester, etc.). However, due to many uncontrollable events such as slight variations in setting up the image acquisition systems (e.g., camera angles with respect to the vehicles), or the inherent differences from site to site (e.g., traffic patterns with respect to the sun), the images collected from each site can vary greatly in terms of contrast, size of regions of interest (ROI's), and the locations of occupants in vehicles, etc. Thus, a classifier trained with images collected from one site often cannot achieve the same performance with images from another site. As such, the classifier must be either retrained, or must possess an ability to adapt to a new domain without, or with only a few, training examples from the new domain. The novel deep CNN fusion architecture of the present embodiments is designed to overcome this and other shortcomings by including a unique multi-layer fusion architecture.

The network is trained with a large set of images from the source domain as a feature extractor. Subsequently, for each new domain (including the source domain), the classification step is fine-tuned with images collected form the corresponding site. In the preferred embodiment, the features from different depths are concatenated with and fine-tuned with weights adjusted for a specific task.

In accordance with another aspect of the exemplary embodiment, there is provided a novel convolutional neural network architecture, wherein said convolutional neural network architecture utilizes features from one or more layers at different depths of the network. As such, the network can be easily adapted across multiple domains without the need for extensive retraining with new domain images. In one non-limiting embodiment, the deep CNN fusion architecture of the present embodiments requires only about a few hundred images across multiple domains for training.

Across different domains, lower-level features are typically more common than higher-level features. The deep CNN fusion architecture of the present embodiments takes advantage of this by extracting features from differently layers of the network, said features including lower-level features and higher-level features. Thus, the lower-level and higher-level features can be concatenated and connected into a single layer that can be classified (i.e. passenger or no-passenger). Additionally, as the system is used across different domains, only a few images are required for further-fine tuning; however, it may not be necessary to fine-tune the system in certain domains. As such, no additional images would be required for fine-tuning the system.

In accordance with another aspect of the exemplary embodiment, the use of the deep CNN fusion architecture of the present embodiments is capable of improving classification accuracy to greater than about 95% in the context of passenger/no-passenger classification. Additionally, the presently described deep CNN fusion architecture is capable of achieving optimum performance across several image classification tasks.

In accordance with another aspect of the exemplary embodiment, there is provided an improved method for domain adaptation based on the deep CNN fusion architecture of the present embodiments. References [2] and [3] describe domain adaptation techniques by training two or more deep networks in parallel using different combinations of source and target domain samples. Similarly, reference [4] proposes an unsupervised domain adaptation method using large amounts of unlabeled data from the target domain. However, these three methods are not directly applicable to on-site real-time applications such as HOV/HOT lane enforcement as they either require strong computational power/hardware to run multiple networks in parallel or need large volume of target domain samples, which are not readily available. The novel deep CNN fusion architecture of the present embodiments is designed to overcome this and other shortcomings by including a unique multi-layer fusion architecture wherein features are extracted from multiple layers and concatenated.

In accordance with another and/or alternative non-limiting aspect of the present embodiments, the learning rate for the fine-tuning of the target domain classification can be adjusted based on the number of images available to the target domain. Such a method can be particularly useful in scenarios where limited labeled data is available in the target domain. As such, the fine-tuning method including the deep CNN fusion architecture of the present embodiments can be used in scenarios where limited labeled data is available in the target domain.

Although the deep CNN fusion architecture of the present embodiments is described as being used in HOV/HOT lanes, it can be appreciated that the deep CNN fusion architecture of the present embodiments can be used in conjunction with other public available datasets and/or domains. Similarly, the deep CNN fusion architecture of the present embodiments can be used with unsupervised domain adaptation applications.

In accordance with another aspect of the exemplary embodiment, there is provided a method of constructing a convolutional neural network (CNN) for domain adaptation utilizing features extracted from multiple levels, including: selecting a CNN architecture including convolutional layers and fully connected layers corresponding to predetermined features associated with a domain; training the CNN on a source domain data set; selecting a plurality of the predetermined features from many of the convolutional layers across the trained CNN; extracting the selected predetermined features from the trained CNN; concatenating the extracted predetermined features to form a final feature vector; connecting the final feature vector to a fully connected neural network classifier; and, fine-tuning the fully connected neural network classifier from a target domain data set.

In accordance with another aspect of the exemplary embodiment, there is provided a convolutional neural network (CNN) including a plurality of levels corresponding to domain features of a predetermined domain, a concatenated feature processor and a softmax activation processor, wherein selected ones of the levels are merged in the concatenated features processor to identify a salient feature of a CNN object item, said processor having an output communicated to the softmax activation processor for generating an object item output of the CNN and wherein the selected ones have a predetermined relationship to identifying the salient feature of the object item in the predetermined domain.

In accordance with another aspect of the exemplary embodiment, there is provided an image classification system for identifying a predetermined aspect of an object image in an object domain, comprising a convolutional neural network (CNN) having a plurality of network layer, each layer comprising an output representative of a feature of the object image to be classified, and a features fusion processor for merging selective ones of the outputs to a concatenated result, the selective ones being associated with a source domain training exercise for a source domain object image, and wherein an alternate set of selective ones of the network layers are merged in the features fusion processor during tuning training of the CNN for a second domain object image, wherein the result represents a classification of the image as including the predetermined aspect.

In accordance with another aspect of the exemplary embodiments, there is provided an image classification system comprising: a computer programmed to perform classification of an input image from a target domain by operations including: processing the input image using a convolutional neural network (CNN) having a plurality of network layers and trained on a source domain training set; processing outputs of at least a fraction of the plurality of network layers of the CNN using a features fusion network trained on a target domain training set to generate a classification of the input image In accordance with another aspect of the exemplary embodiments, there is provided a method of adapting a convolutional neural network (CNN) trained to classify images of a source domain to a target domain, the adaptation method comprising: inputting features output by at least a fraction of the network levels of the CNN into a features fusion network outputting a weighted combination of the inputted features; and training weights of the weighted combination of inputted features using images in a target domain different from the source domain.

In accordance with another aspect of the exemplary embodiments, there is provided a method of operating a convolutional neural network (CNN) for image classification across multiple domains, comprising: capturing a data representation of an image via an imaging device; processing the data representation in the CNN to extract features therein relevant to the image classification including associating CNN levels with the extracted features, and fusing selected ones of the levels in a concatenated features network, wherein the selected ones of the levels have a selective weighting for effecting the image classification; and, determining an output image classification for the image from the concatenated features network wherein the fusion of the selected ones of the levels varies among the multiple domains.

DETAILED DESCRIPTION

The present description and accompanying FIGURES illustrate the embodiments of a novel deep CNN fusion architecture. Also provided is a more efficient method and system for domain adaptation based on said deep CNN fusion architecture for feature extraction. The deep CNN fusion architecture can be used in image classification systems, such as, for example, in HOV/HOT passenger detection systems. As can be appreciated, the deep CNN fusion architecture can be used in other domains.

The present description and accompanying FIGURES also illustrate a two-step training and fine-tuning method using the deep CNN fusion architecture of the present embodiments. Generally, the neural network architecture concatenates features extracted at different depths of the network so as to form a fully connected layer before classification, thereby improving the overall adaptability of the network for use across multiple domains without the need for extensive retraining.

As described above, the deep CNN fusion architecture of the present embodiments can be used in an image classification system for the purpose of identifying a predetermined aspect of an object image in an object domain. The image classification system can include a CNN and a features fusion network for merging selected ones of the outputs to a concatenated result, the result representing a classification of the image as including the predetermined aspect. In one non-limiting embodiment, the predetermined image domain aspect comprises a high occupancy vehicle (HOV).

Figure 1:
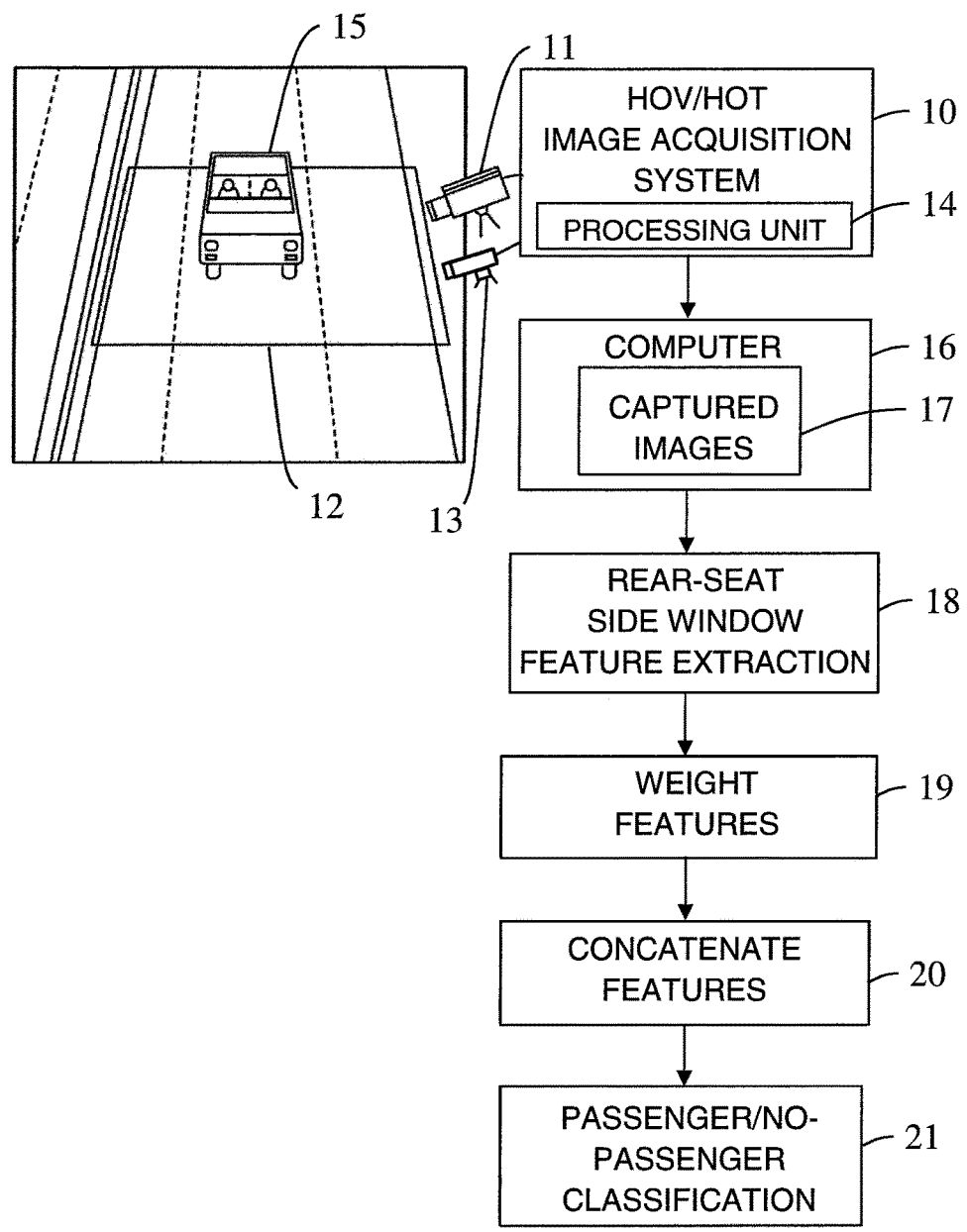
FIG. 1 is a functional block diagram of a multi-level feature fusion architectures in accordance with one embodiment of the present embodiments.

Referring now to FIG. 1, the deep CNN fusion architecture utilizes an image acquisition system 10 including a camera 11 (e.g., near-infrared (IR) camera, etc.), one or more camera triggers 12 (e.g., induction loops installed beneath the road as in red light enforcement systems, laser break beam triggers, etc.), an illuminator 13 (e.g., an infrared (IR) illuminator), and a processing unit 14. The camera 11 and illuminator 13 are typically mounted along the road side to capture vehicle side-view images and see through the passenger rear-seat windows. When the one or more triggers 12 are activated by an incoming vehicle 15, the illuminator 13 flashes and the camera 11 captures a still image of the vehicle 15 from side-view. The exposure time of the camera 11 can be adjusted such that the image acquisition noise and motion blur are traded-off to capture clear images of vehicles driving at a typical speed (e.g., about 30-80 mph). In one non-limiting configuration, a long pass filter (>750 nm) can be used as a component of the illuminator 13 for the purpose of filtering out the visible light to reduce its distraction on drivers. Depending on the road conditions and infrastructure, the geometry of the camera 11 (e.g., distance from camera 11 to trigger 12, distance from camera 11 to roadway, angle between camera 11 and traffic flow, direction of traffic flow, etc.) can be adjusted from site to site. Thus, by using an image acquisition system 10 as described above, a dataset of useful roadway images 17 can be collected. The image acquisition system 10 is typically connected to a computer 16 designed to store the captured images 17 in a network.

The captured images 17 can be stored in a convolutional neural network (CNN) in a plurality of levels and/or layers 22, 24, 26 etc. (see FIG. 2). The plurality of levels 22, 24, 26 can correspond to domain features of the predetermined domain (e.g., HOV detection, etc.). As such, each layer of the CNN comprises an output representative of a feature of the object image to be classified. From a captured image 17, the detected rear-seat side window can be extracted 18 from the rest of the image using deformable parts model as described, for example, in reference [5]. After feature extraction, weights are assigned 19 before features are concatenated 20. Thus, the passenger/no-passenger classification 21 can be performed on the extracted rear-seat window images.

Figure 2:
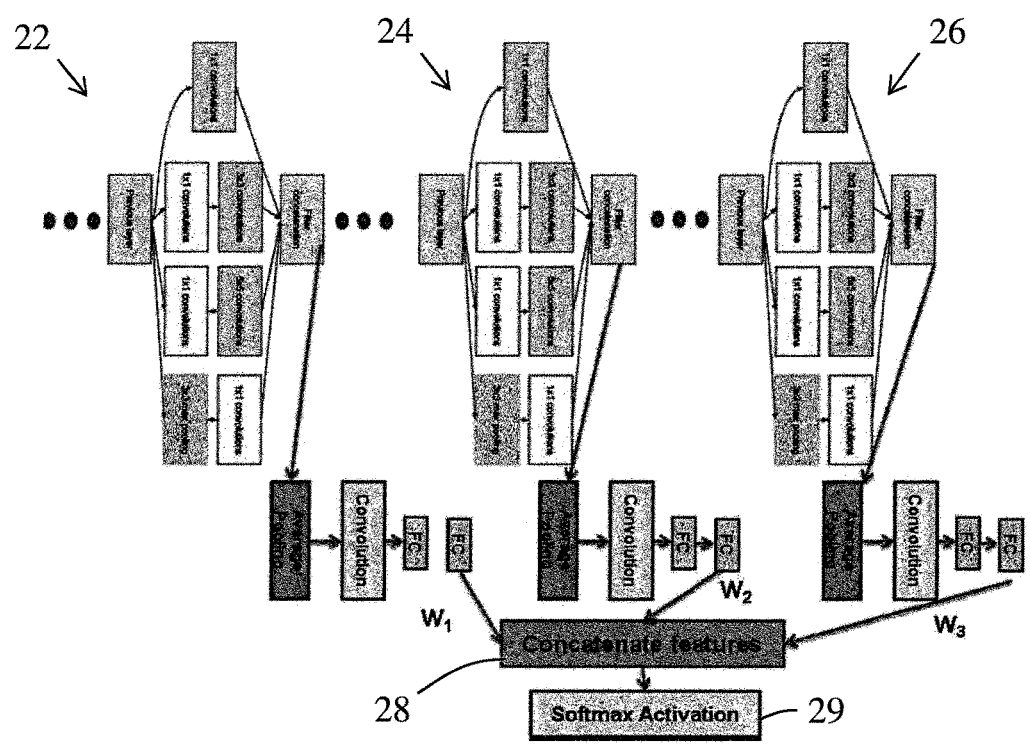
FIG. 2 is a graphical comparison of a present embodiment with the original GoogLeNet at a first, source domain/site.

As described above, features from conventional CNNs are typically extracted through one level feature extraction wherein the features are extracted from the deepest layer wherein the deepest layers include higher-level features. The deep CNN fusion architecture of the present embodiments utilizes a multi-layer feature extraction and fusion. As illustrated in FIGS. 1 and 2, the one or more features can be concatenated via a features fusion network 28 (e.g., a concatenated feature processor) for the purpose of identifying a salient feature of a CNN object item. As such, after concatenating one or more selected features to form a final feature vector, the final feature vector can be connected to a fully connected neural network classifier (e.g., softmax activation). Generally, the features extracted from the network are concatenated to form a fully or partially connected layer before the classification step. The output of the features fusion network 28 can be sent to a non-linear activation function 29 (e.g., softmax activation) for the purpose of generating an object item output of the CNN. As can be appreciated, other or alternative image classification processors can be used. One advantage of the multi-layer feature fusion approach of the present embodiments is that during domain adaptation, the network captures not only the task/domain specific features from the deepest layers, but also the generic features from the earlier layers. Thus, the deep CNN fusion architecture can be carried across multiple domains and does not need to be re-trained across said multiple domains.

For domain adaptation, the network captures both the task/domain-specific features from the deep layers of the network, and also captures the generic features (e.g., edges, corners, etc.) from the earlier layers. Thus, instead of using features from the deepest end of a network (i.e. domain-specific features), the present exemplary embodiment extracts features from multiple different depths of the network. For example, in a network, such as, for example, GoogLeNet, AlexNet, VGG, which includes about 28 layers, features can be extracted from multiple layers of the network. In one non-limiting example embodiment, three modules can be taken from the early (i.e. layers 1-9), mid (i.e. layers 10-19), and late (i.e. layers 20-18) layers, each layer corresponding to an image feature. One advantage of such a system is that if features are extracted from the network from multiple layers and concatenated, a more improved generalized representation is provided with improved adaptability across domains. In one embodiment, the modules used to improve the training efficiency of the network can be used.

As illustrated in FIG. 2, features can be extracted from three different layers 22, 24, 26 or inception modules; however, features can be extracted from greater than three or less than three layers. Layer 22 is illustrated as including primarily low-level features (e.g., edges, corners, etc.). Deeper in the network, layer 24 is illustrated as including slightly higher-level features than layer 22. Examples of higher-level features of layer 24 include the general shape of a nose, the general shape of eyes, the general shape of the door of the car, etc. Similarly, layer 26 still deeper in the network is illustrated as including still higher-level features than layers 22 and 24. Examples of features included in layer 26 include shapes similar to an actual face, shapes similar to an actual vehicle, etc. As such, the one or more selected features to be extracted can be extracted from low, medium, or high level layers of the network. In accordance with one aspect of the exemplary embodiment, the network layers comprise higher layers 24 and 26 and lower layers 22, the lower layers 22 being commonly merged in the features fusion processor 28 for both the source domain object image and the second domain object image. In accordance with another aspect of the exemplary embodiment, the network layers comprise higher layers 24 and 26 and lower layers 22, the lower layers 22 being uniquely merged in the feature fusion processor 28 relative to the source domain object image and the second domain object image, respectively. The one or more features, when extracted, can be extracted directly from the convolutional and/or fully connected layers or through additional convolutional and/or fully connected layers.

With continued reference to FIG. 2, the deep CNN fusion architecture incorporates features across multiple different depths, which depths represent features at different levels (e.g., low-, middle-, and high-level features). Features from different depths of the network are concatenated with and fine-tuned with weights $w_1$, $w_2$ and $w_3$ adjusted for a specific task. The selected features from the various layers can be weighted before concatenation using a learning rate. In one non-limiting embodiment, when a small set of training images are available from a domain, the tuning weights $w_1$, $w_2$, $w_3$ can be assigned in an increasing order from shallow (e.g., level 22) to deep (e.g., level 26) such that the network can learn domain-specific features quickly and efficiently. For example, with reference to FIG. 2, the weights progressively increase such that $w_1 \leq w_2 \leq w_3$. Generally, each layer 22, 24, 26 includes one or more weights. In one non-limiting aspect of the exemplary embodiment, all weights are added into the concatenation step for each layer. Once the weights are adjusted for specific features, the weights for each feature can optionally be added back into the deep CNN fusion architecture for more accurate representations. In embodiments where the deep CNN fusion architecture includes features extracted from all or most layers of the network, the weights for each layer can be adjusted such that certain extracted features are excluded from the concatenation step and are thus not used for image classification purposes.

In one non-limiting aspect of the present embodiments, the plurality of levels 22, 24, 26 of the CNN are weighted with a first value relative to the object item acquired during training of the CNN from the source domain. The plurality of levels 22, 24, 26 are then subsequently weighted with a second value relative to the object item acquired during a second training of the CNN from a tuning domain. Typically, the weighting values of the features extracted from the source domain are different than the weighting values of the features of the tuning domain.

The features fusion network 28 can comprise a first merging of selected ones of the levels for the source domain, and a second merging of the selected ones of the levels for the tuning domain, for domain adaptation of the CNN from a source domain object item to a tuning domain object item, respectively. The selected ones of the first merging, and the selected ones of the second merging typically comprise different levels of the CNN. The selected ones of the first merging and the selected ones of the second merging typically comprise different weighting values.

The deep CNN fusion architecture of the present embodiments can be used in an image classification system. The image classification system can comprise a computer programmed to perform classification of an input image from a target domain by operations including: processing the input image using a CNN having a plurality of network layers and trained on a source domain training set; and processing outputs of at least a fraction of the plurality of network layers of the CNN using a features fusion network trained on a target domain training set to generate a classification of the input image. The source domain training set comprises images of side views of vehicles, and the target domain training set comprises images of side views of vehicles. The computer is typically further programmed to estimate a vehicle occupancy based on the classification of the input image.

In another non-limiting embodiment, the computer is further programmed to train the CNN by optimizing weights of the CNN with respect to the source domain training set. The computer can also be programmed to train the combination of the CNN and the features fusion network by optimizing weights of the features fusion network with respect to the target domain training set. The combination of the CNN and the features fusion network can also be trained by optimizing weights of the CNN with respect to the target domain training set. In one non-limiting embodiment, the training of the combination of the CNN and the features fusion network by optimizing weights of the features fusion network is more strongly optimized with weights for higher network layers of the CNN compared with lower network layers of the CNN.

In another non-limiting embodiment, the computer is further programmed to estimate a vehicle occupancy based on the classification of the input image.

The features fusion network 28 further comprises a features extraction layer operating to extract features from the network layers of the CNN, and a concatenation layer that concatenates the extracted features to generate a concatenated features vector representation of the input image. The weights of the features fusion network generally include weights of the extracted features in the concatenated features vector. The concatenation layer can further include a non-linear activation function 29. The features extraction layer typically comprises a sequence of layers including, in order: an average pooling layer, a convolution layer, and one or more fully connected layers.

One advantage of using the deep CNN fusion architecture of the present embodiments is that when moving from one domain/site to another, the weights for each feature can remain intact, and, typically only a small amount (if any) of feature weights need to be adjusted. Generally, in embodiments where the feature weights are changed across domains, a large number of images are typically needed to re-learn or fine tune those weights. The subject deep CNN fusion architecture according to one non-limiting embodiment of the present embodiments utilizes constant weights across domains, thereby requiring significantly fewer images (e.g., about 600 images) to attain the same or better accuracy detection results than conventional CNN image classification which typically require about 10,000 images.

With continued reference to FIG. 2, the subject deep CNN fusion architecture of the present embodiments is illustrated as taking features from several different levels 22, 24, 26 of the network and concatenating said features via features fusion network 28. Additionally, weights $w_1$, $w_2$ and $w_3$ are assigned to said extracted features based on specific tasks in image classification. The multiple features extracted are typically connected so as to form one fully connected layer comprising features extracted from separate layers of the network. In comparison, the original GoogLeNet (see [1] above) is slightly modified to have two connected layers at the deepest end of the network such that it has the same structure as the output at the two earlier modules. It is advantageous to include features extracted from multiple different layer because the lower-level features (i.e. earlier layers) include the most common features across multiple domains. For example, the edges of a car window do not typically change between different domains. Higher-level features (e.g., the shape of an occupants head, an occupant wearing a cap, etc.) however typically vary across domains. For example, an occupant can be wearing a hat in one site and an occupant can be absent a hat in a second site. As such, levels of the network that are optionally selected for feature extraction have a predetermined relationship which can be used for the purpose of identifying a salient feature of an object item in the predetermined domain.

The first merging of selected levels from a source domain, and the second merging of selected levels from a tuning domain by the features fusion network 28 as described above provides a deep CNN fusion architecture in which improved domain adaptation of the CNN from a source domain object item to a tuning domain object item can be attained. As such, the deep CNN fusion architecture can be particularly useful for domain adaptation in classifying passenger/no-passenger images for an automated HOV/HOT lane enforcement system.

There is also provided a two-step training/fine-tuning process using the deep CNN fusion architecture of the present embodiments across multiple domains, comprising: training the CNN with a first, large set of images from a source domain as a feature extractor; and fine-tuning the trained network with a second set of images for each domain including the source domain. In one embodiment, the network is fine-tuned only for the concatenated layers onward for each specific domain including the source domain. As described above, the weights for the fine-tuning can be adjusted for different applications, such as, for example, in embodiment wherein only a certain amount of images available from a target domain is expected, the weight can be adjusted and/or assigned in an increasing and/or decreasing order across network layer levels. The target domain can be the same or different than the source domain. Typically, the training and fine-tuning data sets are different.

There is also provided a method of adapting a CNN trained to classify images of a source domain to a target domain, the adaptation method comprising training at least some weights of the CNN using the images in a target domain different from the source domain concurrently with the training of the weights of the weighted combination of inputted features. The training of at least some weights of the CNN are preferentially adjusted for higher network levels of the CNN.

Figure 3:
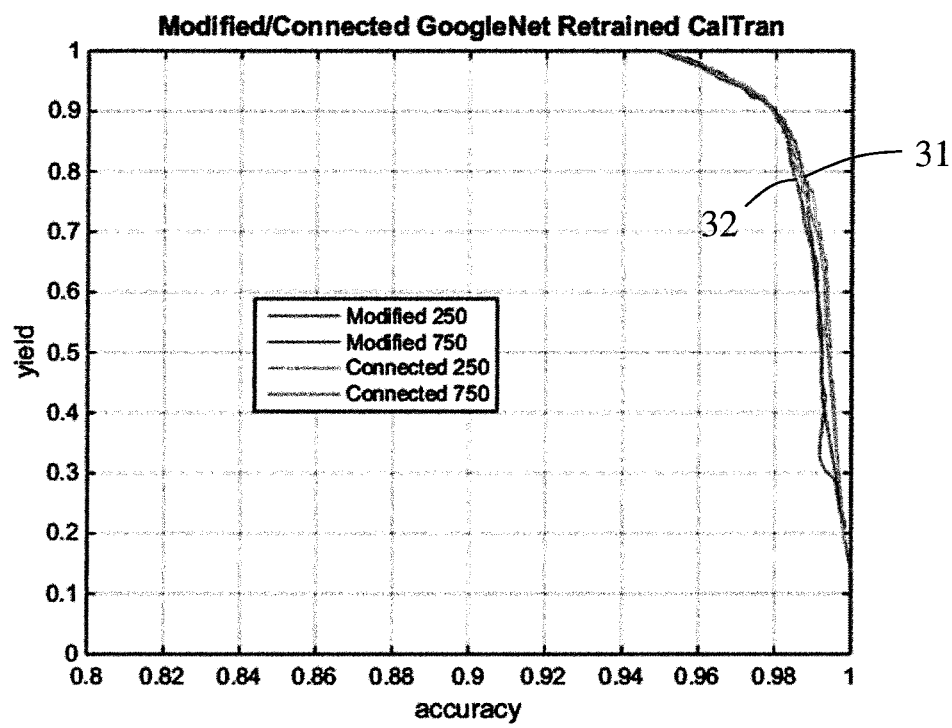
FIG. 3 is a graphical comparison of a present embodiment with the original GoogLeNet at a first, target domain/site; and, FIG. 4 is a graphical comparison of a present embodiment with the original GoogLeNet at a second, target domain/site.
Figure 4:
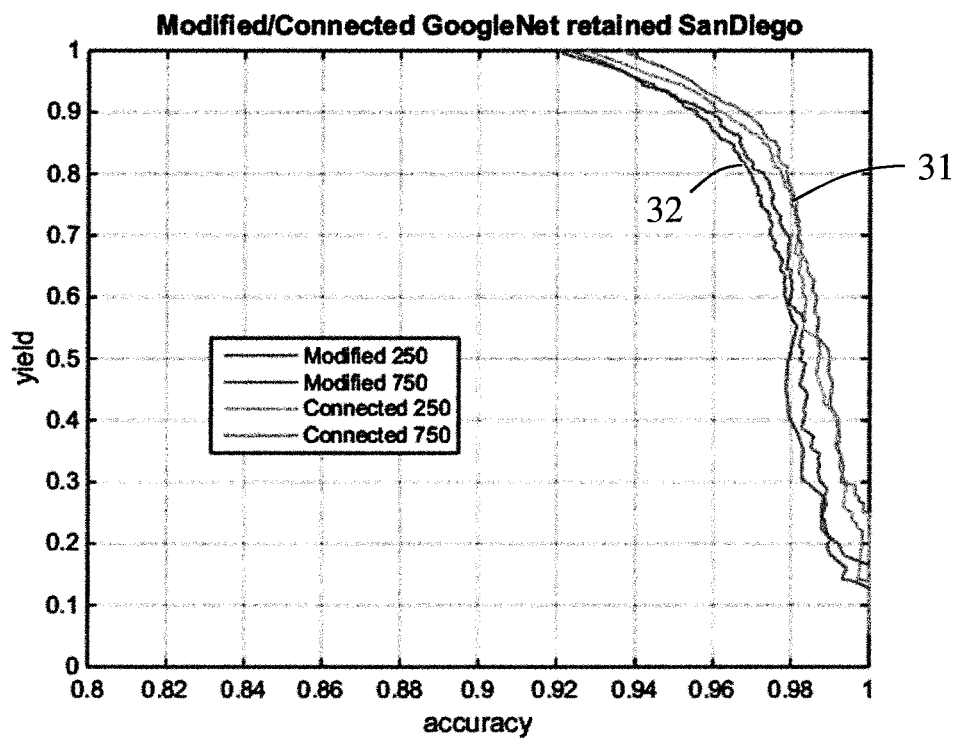

With reference to FIGS. 3-4, the process of training/fine-tuning is more particularly illustrated. In one non-limiting example, image datasets were initially collected across three different sites (a source domain C, a first target domain D, and a second target domain S). The subject network was first trained with 30,000 images from the source domain, including 15,000 images for positive samples (i.e. passenger) and 15,000 images for negative examples (i.e. no-passenger). The trained network was then fine-tuned with 250 or 750 images for each domain, including the source domain, where the fine-tuning was performed using 28 epoch each with 220 and 656 iterations, respectively. Each of the experiments was repeated three times with the 250 and 750 images selected randomly out of the images from the target domains D and S, respectively, which yield three different fine-tuned networks. During the selection of the training examples, the 250 images were selected as a subset of the 750 images. The sets contained a total of 2082, 1991, and 818 images from the source domain C, and target domains D and S, respectively. The images were taken at different days other than the days selected for the training set.

The graphical illustrations in FIGS. 3-4 detail a comparison of the subject embodiment with the GoogLeNet (see [1] above) for the purpose of illustrating the advantages of using a multi-layer fusion architecture as presently described. More specifically, FIG. 3 is a yield versus accuracy comparison at a source domain, C, and FIG. 4 is a yield versus accuracy comparison at a second target domain, S. As illustrated in FIGS. 3-4, the performance comparisons are detailed in terms of yield and accuracy with 2082 and 818 test images from domains C and S, respectively, as described above. Furthermore, as seen in FIGS. 3-4, the presently descried convolutional neural network demonstrates improved performance 31 (i.e. improved detection accuracy) in the target domain when compared to the existing networks 32. In one non-limiting configuration, the deep CNN fusion architecture of the present disclosure demonstrates an improved performance with only 250 images used in the training/fine-tuning process in a target domain.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of training a convolutional neural network (CNN) for domain
    adaptation utilizing features extracted from multiple levels, including:
    selecting a CNN architecture including a plurality of convolutional layers and fully connected layers;
    training the CNN on a source domain data set;
    selecting a plurality of layers from the plurality of convolutional layers across the trained CNN;
    extracting features from the selected layers from the trained CNN;
    concatenating the extracted features to form a feature vector;
    connecting the feature vector to a fully connected neural network classifier; and,
    fine-tuning the fully connected neural network classifier from a target domain data set
        by optimizing weights of the CNN with respect to the target domain data set by more strongly optimizing weights of higher network layers of the CNN compared with lower network layers of the CNN.

2. The method of claim 1 wherein the selected CNN network can be any CNN network selected from the group consisting of GoogLeNet, AlexNet, VGG-M, VGG-D, and VGG-F.

3. The method of claim 1 wherein the concatenating features includes a feature vector that can be weighted before the concatenating using a learning rate.

4. The method of claim 1 wherein the connecting the concatenated feature vector includes any type of fully connected neural network including softmax activation.

5. The method of claim 1 wherein the target domain can be different or the same as the source domain.

6. The method of claim 1 wherein the training and fine-tuning use different datasets.

7. An image classification system comprising:
    a computer programmed to perform classification of an input image from a target domain by operations including:
        processing the input image using a convolutional neural network (CNN) having a plurality of network layers and trained on a source domain training set;
        processing outputs of at least a fraction of the plurality of network layers of the CNN using a features fusion network trained on a target domain training set to generate a classification of the input image;
        training the CNN by optimizing weights of the CNN with respect to the source domain training set and training the combination of the CNN and the features fusion network by optimizing weights of the features fusion network with respect to the target domain training set wherein the features fusion network includes:
            a features extraction layer operating to extract features from the network layers of the CNN;
            a concatenation layer that concatenates the extracted features to generate a concatenated features vector representation of the input image;
            and wherein the weights of the features fusion network include weights of the extracted features in the concatenated features vector; and,
            optimizing weights of the CNN with respect to the target domain training set by more strongly optimizing weights of higher network layers of the CNN compared with lower network layers of the CNN.

8. A method of adapting a convolutional neural network (CNN) trained to classify images of a source domain to a target domain, the adaptation method comprising:
    inputting features output by at least a fraction of the network levels of the CNN into a features fusion network outputting a weighted combination of the inputted features; and
    training weights of the weighted combination of inputted features using images in a target domain different from the source domain; and
    classifying the image in accordance with the trained weights by optimizing weights of the CNN with respect to the target domain data set by more strongly optimizing weights of higher network layers of the CNN compared with lower network layers of the CNN.

9. The adaptation method of claim 8 further comprising:
    training at least some weights of the CNN using the images in a target domain different from the source domain concurrently with the training of the weights of the weighted combination of inputted features.

10. The adaptation method of claim 9 wherein the training of at least some weights of the CNN preferentially adjusts weights of higher network levels of the CNN.

11. The method of claim 1 further including confirming vehicle occupancy in a high occupancy vehicle lane by using the trained CNN.

12. The system of claim 7 wherein the operations further include confirming vehicle occupancy in a high occupancy vehicle lane by using the trained CNN.

13. The method of claim 8 further including confirming vehicle occupancy in a high occupancy vehicle lane by using the trained CNN.

14. The system of claim 7 wherein the features fusion network includes:
    a features extraction layer operating to extract features from the network layers of the CNN; and
    a concatenation layer that concatenates the extracted features to generate a concatenated features vector representation of the input image.

15. The system of claim 7 wherein the concatenation layer further includes a nonlinear activation function.

16. The system of claim 7 wherein the features extraction layer comprises a
sequence of layers including, in order:
an average pooling layer;
a convolution layer; and
one or more fully connected layers.

* * * * *